Dec. 5, 1961 J. G. STONE 3,011,752
LIQUID LEVEL CONTROL VALVE
Filed Dec. 1, 1958

INVENTOR.
JOHN G. STONE
BY John N. Wolfram
ATTORNEY

United States Patent Office 3,011,752
Patented Dec. 5, 1961

3,011,752
LIQUID LEVEL CONTROL VALVE
John G. Stone, Los Angeles, Calif., assignor to Parker-Hannifin Corporation, Cleveland, Ohio, a corporation of Ohio
Filed Dec. 1, 1958, Ser. No. 777,280
12 Claims. (Cl. 251—45)

This invention relates to pilot valve controlled fluid pressure operated valves and more particularly to a means for directing an average fluid pressure within the main valve inlet port to the main valve for closing the same.

In known arrangements for controlling the level to which a tank may be filled with liquid there is provided a main valve housing having inlet and outlet ports, a main fluid pressure operated valve for opening and closing the inlet port, a pressure chamber, a restricted orifice for admitting fluid from the inlet port to the pressure chamber, and a bleed port leading from the pressure chamber to a float controlled pilot valve. When the tank is less than full, the float is in a lowered position in which it holds the pilot valve open. When liquid is then introduced to the inlet port of the main valve, pressure of the liquid opens the main valve and the liquid flows into the tank. A portion of the liquid passes through the orifice to the pressure chamber and bleeds out through the pilot valve. When the tank has been filled enough to raise the float, the pilot valve closes to trap the liquid within the pressure chamber where it builds up in pressure on the upper side of the valve member and causes the latter to close.

In valves of this type, the unit liquid pressure which is transmitted to the pressure chamber is substantially the sum of the static and dynamic unit fluid pressures existing in the inlet port in the immediate vicinity of the orifice. This unit pressure may be lesser or greater than the unit pressures acting at other portions of the main valve member tending to open the same, depending upon the configuration of the inlet section and of the piping immediately upstream of the main valve. Thus, for example, a T or elbow fitting close to the valve inlet port would cause a different distribution of static and dynamic fluid pressures on the inlet side of the main valve member than would a straight-in connection.

If the unit fluid pressure (static plus dynamic) at the vicinity of the orifice is greater than the average unit pressure acting on the inlet side of the valve member, the fluid pressure in the pressure chamber will build up more rapidly and to a higher peak value when the pilot valve shuts off and the main valve will then be shut off sooner than normal. This will induce undesirable pressure surges in the inlet port and will also result in failure to fill the tank to the desired level since the flow through the main valve is cut off with less than normal overshoot, the latter being the amount of fluid which normally enters the tank in the relatively small time interval between closing of the pilot valve and closing of the main valve.

If the unit fluid pressure at the orifice is smaller than the average unit fluid pressure in the inlet port acting to open the main valve, the fluid pressure within the pressure chamber will build up less quickly after closing of the pilot valve and the main valve will close slower than normal so that the overshoot will be excessive.

The present invention seeks to avoid these undesirable effects caused by uneven distributions of fluid pressures within the inlet port by providing a baffle which forms a sensing chamber between the inlet port and the orifice and which operates to admit fluid to the sensing chamber in such a manner that the unit pressure therein in the region adjacent the orifice will be substantially equal to the average unit pressure afforded by the static and dynamic forces acting to move the main valve member in the opening direction.

Another object is to provide a sensing chamber of the type described in which the unit pressure in the vicinity of the orifice is substantially the same as the average unit pressure existing in selected regions of the inlet port, as for example, at the circumferential region of the inlet port.

Another object is to provide a sensing chamber of the type described in which the baffle is so formed that it will take particular advantage of velocity pressures.

Another object is to provide a baffle for forming a sensing chamber as described in which provision is made for draining the sensing chamber.

Other objects will be apparent from the following description and from the drawing in which.

Figure 1:
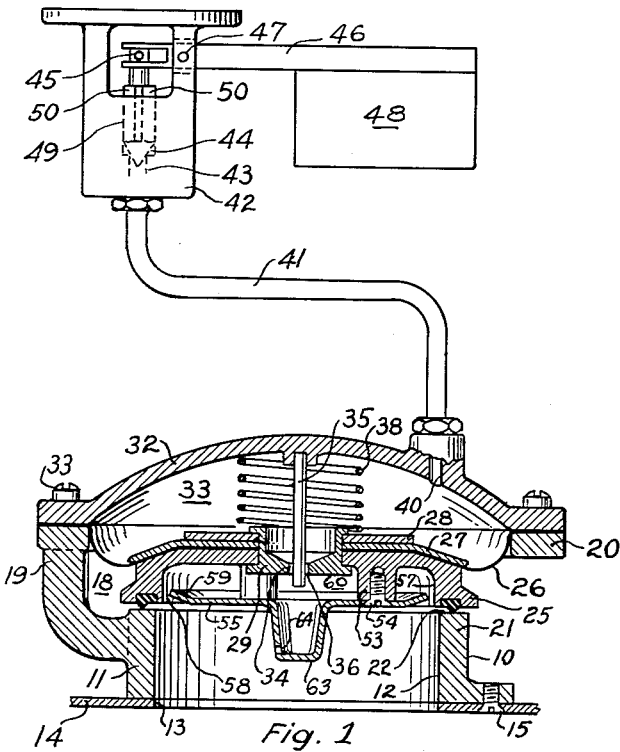
FIGURE 1 shows a float controlled pilot operated main valve with the pilot shown in side elevation and the main valve shown in vertical cross section and fitted with a baffle for forming a sensing chamber in which the unit fluid pressure adjacent the orifice is substantially the same as the average unit pressure at the circumference of the inlet port.
Figure 2:
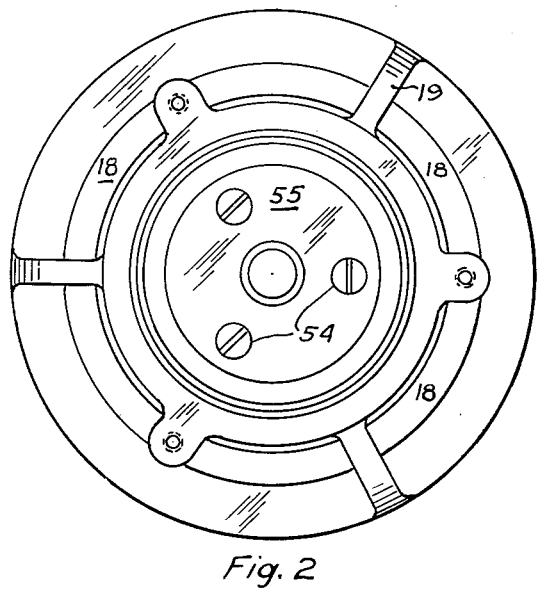
FIGURE 2 is a bottom view of the main valve of FIGURE 1.

As shown in FIGURE 1, the main fluid pressure operated valve 10 comprises a housing 11 having an inlet port 12 in register with an intake opening 13 of a tank 14 within which the main valve is secured as by screws 15. The housing 11 has outlet openings 18 formed between webs 19 which integrally connect an annular mounting ring portion 20 of the housing with the housing inlet section 21. The latter has a valve seat 22 formed thereon.

A valve member 25 is engageable with the valve seat 22 for controlling flow from the inlet to the outlet and is attached to a flexible diaphragm 26 by means of a plate 27, washer 28, and a rivet 29. The outer margin of the diaphragm 26 is clamped to the mounting ring 20 by means of a cap 32 and screws 33. The cap 32, diaphragm 26, and valve member 25 define a pressure chamber 33. The rivet 29 has an opening 34 therethrough. A pin 35 fixedly mounted within the cap 32 extends through the opening 34 in all positions of the valve member 25 and is of slightly smaller diameter than the opening 34 so as to form an annular restricted orifice 36 which communicates the underside of the valve member 25 with the pressure chamber 33. The pin 35 functions to prevent the lodging of foreign matter within the restricted orifice and may also aid in the guiding of the valve member 25 in its movements between open and close positions.

A spring 38 exerts a light seating pressure on the main valve member 25. A bleed passage 40 in the cap 32 communicates the pressure chamber 33 with a tube 41 which leads to a pilot valve structure 42 which is located near the top of the tank. The pilot valve includes an inlet opening 43, a valve member 44 which is connected by means of a pin 45 to a float arm 46 which in turn is pivotally connected by the pin 47 to the pilot valve 42 and carries a float 48. The pilot valve 44 fits within a circular bore 49 and has flatted portions 50 to provide fluid passages from the pilot valve inlet 43 to the interior of the tank.

Attached to bosses 53 on the under side of the valve member 25 by means of screws 54 is a baffle plate 55. This plate is of a diameter slightly smaller than the opposed diameter of the recess 57 in the valve member so as to form an annular opening 58 therebetween and is preferably slightly upturned at its rim as shown at 59, although such upturning is not essential. The plate 55 is spaced from the underside of the valve member 25 so as to form a sensing chamber 60 therebetween, and it has a depending central portion 63 for receiving the cleaning pin 35 when the valve member is moved upward to an open position. A small opening 64 is preferably provided at the lower end of the depending portion 63 for draining the cavity formed by the latter when servicing the valve. This opening is also useful for draining any water which may collect in the depending portion 63 when the valve is used for fuel or other liquids.

The baffle plate 55 is substantially flat, except for the depending cup like central portion 63, and is in substantial transverse alignment with the seating face of the valve member 25 so as to provide a smooth flow path for fluid flowing from inlet port 12 to outlet port openings 18 when the valve member is in open position.

When the tank is empty or only partially full, the float 48 is in a downward position due to gravity and because of the pivot 47 and the connection at 45 to the pilot valve member 44, it will hold the pilot valve member in an upward position in which the inlet port 43 is open to the bore 49 and the passages afforded by the flatted surfaces 50 to the interior of the tank. As fluid under pressure is introduced from the exterior of the tank to the main valve inlet port 12, it exerts an upward pressure on the baffle plate 55 to move the valve member 25 upwards away from the seat 22 and permit flow of fluid from the inlet port 12 through the openings 18 to the interior of the tank.

Part of the fluid coming into the inlet port 12 passes through the opening 58 adjacent the rim of the baffle and enters the sensing chamber 60 from where it passes through the restricted orifice 36 into the pressure chamber 33. From the latter the fluid bleeds out through passage 40, tube 41, and the open inlet port 43 to the interior of the tank. The latter group of passages are of greater fluid carrying capacity than the restricted orifice 36 so that there will be no substantial buildup of pressure within the chamber 33 as long as the pilot valve 44 is open.

When the tank has been filled to the proper level, the float 48 will be buoyed upwardly to close the pilot valve 44 thereby trapping the fluid within chamber 33 and causing the pressure to build up in the latter for exerting a force on the top side of the valve member 25 and diaphragm 26 sufficient to close the main valve 25 against the pressure of fluid within the inlet port 12. The unit pressure within the pressure chamber 33 during this closing movement is substantially equal to the unit pressure provided by the combined dynamic and static pressures of the fluid in the vicinity of the lower end of the orifice 36, less the pressure loss due to passage of the fluid through the orifice. With the baffle plate 55 shown in FIGURE 1, the unit fluid pressure at the lower end of the orifice 36 is substantially equal to the average unit pressure existing at the peripheral portion of the inlet 12 adjacent the annular opening 58. Thus the pressure transmitted to pressure chamber 33 is largely a function of the average fluid pressures existing about the periphery of the inlet port 12. Without the baffle, the pressure in chamber 33 during the closing movement would be a function of the specific pressures existing in the central portion of the inlet 12 adjacent the orifice 36.

If in one given installation there is an elbow fitting in the piping (not shown) leading to the valve port 12, there would be a tendency for the fluid pressures within the inlet 12 to be unequally distributed. Thus there may be higher velocity effects at a portion of the inlet periphery than in other portions, or than at the central portion. Another installation may have a reverse situation. By averaging the pressures which exist at the periphery of the inlet any one valve will be more satisfactory for use in a variety of installations where different distributions of pressures are obtained in the inlet port due to variable configurations of the upstream piping.

Figure 3:
FIGURE 3 is a vertical cross section of an alternate form of baffle for providing a unit pressure within the sensing chamber adjacent the orifice which is substantially the same as the average unit pressure existing across the entire cross section of the inlet port.
Figure 4:
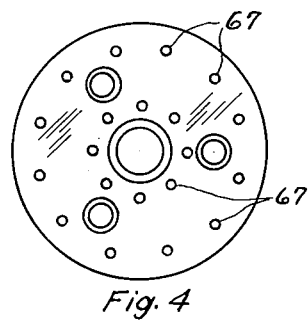
FIGURE 4 is a bottom view of the baffle of FIGURE 3.

The alternate form of baffle plate illustrated in FIGURES 3 and 4 is provided with a series of small openings 67 scattered across the plate. These may or may not be in addition to a peripheral opening corresponding to 58 of FIGURE 1. The total area of the openings 67 (and 58) is substantially less than the cross sectional area of the plate itself, or of the inlet opening 12, so as to more effectively cause an averaging of the fluid pressures existing at various cross sectional regions of the inlet 12.

Figure 5:
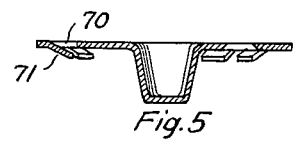
FIGURE 5 is a vertical section view of a baffle for utilizing to a greater degree the velocity pressure of fluid approaching the main valve seat as an element of the sensed fluid pressure within the sensing chamber.
Figure 6:
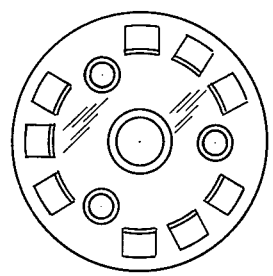
FIGURE 6 is a bottom view of the baffle of FIGURE 5.

The modification of the baffle plate illustrated in FIGURES 5 and 6 employs a series of openings 70 formed by downwardly directed tabs 71 formed adjacent the periphery of the plate. These tabs take advantage of the direction of flow of the liquid as it leaves the inlet port 12 to pass over the valve seat 22 into the interior of the tank and thus directs a greater proportion of velocity pressure into the sensing chamber 60 than is otherwise obtained. This results in less loss of pressure between the inlet port 12 and the pressure chamber 33 and results in less over-balance area required for closing the main valve under given conditions. This means that the effective area of the diaphragm 26 may be of a smaller diameter than otherwise, and hence the diameter of the mounting ring 20 may likewise be smaller with a corresponding saving in the weight and envelope size of the valve.

It is apparent that other configurations of the flow passages through or around the baffle plate, as well as other changes in the shape and arrangement of the parts may be provided and still utilize the invention herein described and as covered by the following claims.

I claim:

1. A valve comprising a housing having an inlet port and an outlet port and a valve seat surrounding the inlet port, a fluid pressure operated valve member movable within said housing for opening and closing communication between said inlet and outlet ports, an expansible pressure chamber in said housing, said valve member comprising a movable wall of said pressure chamber and being movable by fluid pressure within said chamber to a closed position, a bleed passage leading from said pressure chamber, means located on the upstream side of the valve member forming a sensing chamber of a diameter approximating that of the inlet port, a restricted orifice connecting the sensing chamber with the pressure chamber, and means for providing limited access of fluid from said inlet port to said sensing chamber.

2. A valve in accordance with claim 1 in which said orifice extends axially through said valve member and said limited access means is spaced laterally of said orifice.

3. A valve in accordance with claim 1 in which said limited access means is located closer to the periphery of the inlet port than to the longitudinal axis of said inlet port.

4. A valve comprising a housing having an inlet port and an outlet port and a valve seat surrounding the inlet port, a fluid pressure operated valve member movable within said housing for opening and closing communication between said inlet and outlet ports, an expansible pressure chamber in said housing, said valve member comprising a movable wall of said pressure chamber and being movable by fluid pressure within said chamber to a closed position, a bleed passage leading from said pressure chamber, means located on the upstream side of the valve member forming a sensing chamber, a restricted orifice connecting the sensing chamber with the pressure chamber, and an annular opening adjacent the periphery of the inlet port for providing limited access of fluid from said inlet port to said sensing chamber.

5. A valve comprising a housing having an inlet port and an outlet port and a valve seat surrounding the inlet port, a fluid pressure operated valve member movable within said housing for opening and closing communication between said inlet and outlet ports, an expansible pressure chamber in said housing, said valve member comprising a movable wall of said pressure chamber and being movable by fluid pressure within said chamber to a closed position, a bleed passage leading from said pressure chamber, a baffle plate attached to the valve member on the upstream side thereof and forming with said valve member a sensing chamber, said baffle plate being of a diameter approximating the diameter of the inlet port, a restricted orifice connecting the sensing chamber with the pressure chamber, and means for providing limited access of fluid from said inlet port to said sensing chamber.

6. A valve comprising a housing having an inlet port and an outlet port and a valve seat surrounding the inlet port, a fluid pressure operated valve member movable within said housing for opening and closing communication between said inlet and outlet ports, an expansible pressure chamber in said housing, said valve member comprising a movable wall of said pressure chamber and being movable by fluid pressure within said chamber to a closed position, a bleed passage leading from said pressure chamber, a baffle plate attached to the upstream side of said valve member and forming therewith a sensing chamber, an annular opening between the rim of the baffle plate and a portion of the valve member for providing limited access of fluid from said inlet port to said sensing chamber, and a restricted orifice connecting the sensing chamber with said pressure chamber.

7. A valve comprising a housing having an inlet port and an outlet port and a valve seat surrounding the inlet port, a fluid pressure operated valve member movable within said housing for opening and closing communication between said inlet and said outlet ports, an expansible pressure chamber in said housing, said valve member comprising a movable wall of said pressure chamber and being movable by fluid pressure within said chamber valve to a closed position, a bleed passage leading from said pressure chamber, baffle means carried by said valve member on the upstream side thereof and forming with said valve member a sensing chamber, an annular opening between an outer rim portion of the baffle means and a portion of the valve member, at least one of said portions providing a tapered surface leading to said annular opening, said annular opening providing limited access of fluid from said inlet port to said sensing chamber, and a restricted orifice connecting the sensing chamber with said pressure chamber.

8. A valve comprising a housing having an inlet port and an outlet port and a valve seat surrounding the inlet port, a fluid pressure operated valve member movable within said housing for opening and closing communication between said inlet and said outlet ports, an expansible pressure chamber in said housing, said valve member comprising a movable wall of said pressure chamber and being movable by fluid pressure within said chamber to a closed position, a bleed passage leading from said pressure chamber, baffle means carried by said valve member on the upstream side thereof and forming with said valve member a sensing chamber, an annular opening between the outer rim of the baffle means and a portion of the valve member, said rim being upwardly turned for providing a tapered entrance to said annular opening, said annular opening providing limited access of fluid from said inlet port to said sensing chamber, and a restricted orifice connecting the sensing chamber with said pressure chamber.

9. A valve comprising a housing having an inlet port and an outlet port and a valve seat surrounding the inlet port, a fluid pressure operated valve member movable within said housing for opening and closing communication between said inlet and said outlet ports, an expansible pressure chamber in said housing, said valve member comprising a movable wall of said pressure chamber and being movable by fluid pressure within said chamber to a closed position, a bleed passage leading from said pressure chamber, baffle means carried by said valve member on the upstream side thereof and forming with said valve member a sensing chamber, a restricted orifice connecting the sensing chamber with the pressure chamber, passage means for providing limited access of fluid from said inlet port to said sensing chamber, said baffle means including a depending cup-like portion into which fluid may collect, and an opening at the lowest portion of said cup-like portion through which such collected fluid may drain, said opening being in a transverse direction with respect to the axis of said inlet port.

10. A valve comprising a housing having an inlet port and an outlet port and a valve seat surrounding the inlet port, a fluid pressure operated valve member movable within said housing for opening and closing communication between said inlet and said outlet ports, an expansible pressure chamber in said housing, said valve member comprising a movable wall of said pressure chamber and being movable by fluid pressure within said chamber to a closed position, a bleed passage leading from said pressure chamber, baffle means carried by said valve member on the upstream side thereof and forming with said valve member a sensing chamber, a restricted orifice connecting the sensing chamber with the pressure chamber, passage means for providing limited access of fluid from said inlet port to said sensing chamber, and means associated with said passage means and projecting into the flow stream of fluid passing from said inlet port to said outlet port when said valve member is in open position for directing a portion of said fluid in said flow stream through said passage means.

11. A valve comprising a housing having an inlet port and an outlet port and a valve seat surrounding the inlet port, a fluid pressure operated valve member movable within said housing for opening and closing communication between said inlet and said outlet ports, an expansible pressure chamber in said housing, said valve member comprising a movable wall of said pressure chamber and being movable by fluid pressure within said chamber to a closed position, a bleed passage leading from said pressure chamber, a baffle plate carried by said valve member on the upstream side thereof and forming with said valve member a sensing chamber, a series of openings in said baffle plate adjacent said valve seat providing for limited access of fluid from said inlet port to said sensing chamber, said baffle plate having means thereon for directing a portion of the fluid approaching the valve seat through said openings when the valve member is in open position, and a restricted orifice connecting the sensing chamber with said pressure chamber.

12. A valve comprising a housing having an inlet port and an outlet port and a valve seat surrounding the inlet port, a fluid pressure operated valve member movable within said housing and having a seating face engageable and disengageable with said valve seat for closing and opening communication between said inlet and outlet ports, an expansible pressure chamber in said housing, said valve member comprising a movable wall of said pressure chamber and being movable by fluid pressure within said chamber to a closed position, a bleed passage leading from said pressure chamber, said valve member having a recess in its upstream side, said recess being of a diameter approximating that of the inlet port, said recess being closed by a baffle plate attached to said valve member, said recess constituting a sensing chamber, passage means for providing limited access of fluid from said inlet port to said sensing chamber, said baffle plate having a central depending cup-like portion surrounded by a substantially flat transverse alignment with said seating face for providing a smooth flow path for fluid flowing from said inlet port to said outlet port when said valve member is in open position, a restricted orifice connecting the sensing chamber with the pressure chamber, and passage means for providing limited access of fluid from said inlet port to said sensing chamber.

References Cited in the file of this patent

UNITED STATES PATENTS

| | | |
|---|---|---|
| 2,623,726 | Suska | Dec. 30, 1952 |
| 2,781,772 | Russell | Feb. 19, 1957 |